UNITED STATES PATENT OFFICE.

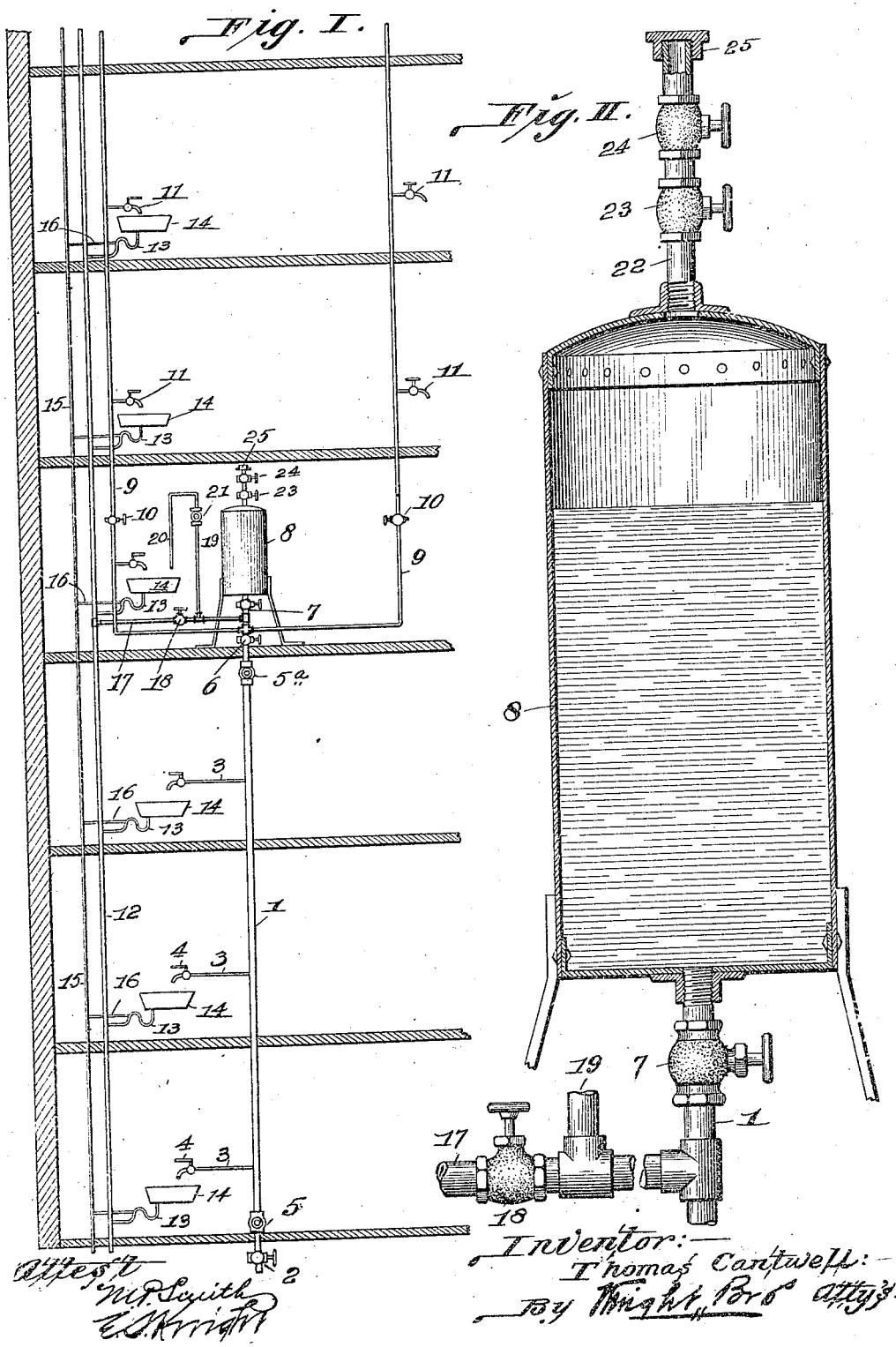

THOMAS CANTWELL, OF ST. LOUIS, MISSOURI.

WATER-SUPPLY APPARATUS FOR BUILDINGS.

SPECIFICATION forming part of Letters Patent No. 648,847, dated May 1, 1900.

Application filed September 11, 1899. Serial No. 730,124. (No model.)

*To all whom it may concern:*

Be it known that I, THOMAS CANTWELL, a citizen of the United States, residing at the city of St. Louis, in the State of Missouri, have invented certain new and useful Improvements in Water-Supply Apparatus for Buildings, of which the following is a full, clear, and exact description, reference being had to the accompanying drawings, forming part of this specification.

My invention relates to a water-supply apparatus for use in buildings, the object of the invention being to utilize the reactionary force or concussion created in the apparatus, known as "water-hammer," to raise the water through the pipes to an elevation therein and store it in a tank forming a part of the apparatus.

It is a well-known fact that in the water-supply apparatus of buildings where the apparatus-pipes are carried to any considerable height it is impossible to at all times maintain a continuous supply of water at the upper end of the apparatus owing to the fact that there does not exist sufficient pressure to automatically carry the water to the greatest elevation when the pressure is reduced by reason of water being withdrawn from the supply or conveying pipes.

In the apparatus which I have devised I provide for the maintenance of a constant supply of water at the greatest elevation of the apparatus, as will be hereinafter shown.

My invention consists in features of novelty hereinafter fully described, and pointed out in the claims.

Figure I is a view in elevation of my improved apparatus applied to a building. Fig. II is an enlarged vertical sectional view of the reservoir-tank with which the apparatus is equipped, the pipes and valves connected thereto being shown in elevation.

1 designates the main water-supply pipe, leading into the building from a source of supply and provided with a shut-off valve 2. 3 designates branch pipes leading from the supply-pipe 1 and provided with cocks or faucets 4. Located at intervals in the supply-pipe 1 are check-valves 5 and 5ˣ, that permit the inflow of water through said pipe, but prevent retrograde flow thereof. The pipe 1 is also provided with shut-off valves 6 and 7, and said pipe leads to a reservoir-tank 8, located on one of the upper floors of the building in which the apparatus is placed.

9 designates branch supply-pipes connected to the supply-pipe 1 intermediate of the locations of the valves 6 and 7 in said main supply-pipe. The branch pipes are provided with shut-off valves 10 and cocks or faucets 11, through which water may be drawn to supply the needs of the upper floors of the building.

12 designates a waste-pipe to which the usual trap-pipes 13 lead from sinks 14 or other receptacles into which the water is discharged from the cocks or faucets 4 and 11.

15 is a vent-pipe provided with connecting-pipes 16, leading to the trap-pipes 13.

17 designates a drain-pipe provided with a valve 18 and leading from the main supply-pipe 1 from a point between the valves 6 and 7 to the waste-pipe 15. This drain-pipe 17 is designed for service in draining the water from the reservoir-tank 8 for the purpose of cleansing or repairing.

19 designates a pressure-exhaust pipe leading from the drain-pipe 17 and having an open end 20. This pressure-exhaust pipe is provided with a pressure-check valve 21, adapted to retain water therein at a limited degree of pressure, but subject to being overcome by a high pressure of water when the water may flow to the open end 20 of said pipe to relieve the high degree of pressure and avoid danger to the pipes or tank of the apparatus.

22 designates an air-relief pipe provided with valves 23 and 24. This air-relief pipe is mounted on the reservoir-tank 8 and is designed to provide communication from the interior of the tank to the exterior of the tank for the escape of air from said tank when too great an amount of air is present within the tank. Either of the valves 23 or 24 might be utilized alone; but I prefer to employ the two valves, inasmuch as concussion within the apparatus is liable to effect a wear upon the valve-seats and to cause a leakage, and by using a second upper valve any leakage that results past the first valve is stopped by the second.

25 is a cap that incloses the end of the pipe 22 to exclude dirt therefrom.

In the practical use of this apparatus the concussion or water-hammer resulting from the opening and closing of the cocks throughout the pipe 1 in drawing water therefrom exerts a force within the pipes of the apparatus to carry the water upwardly therein. In such action the check-valve 5 prevents downward movement of the water, while the check-valve 5$^a$ permits the water to flow upwardly past the valves 6 and 7 into the reservoir-tank 8, the impetus of the water being effected on the principle of a water-ram. The water after passing the check-valve 5$^a$ is prevented from returning past said valve by reason of the valve closing automatically, and such water is therefore stored in the reservoir-tank to be drawn therefrom into the branch supply-pipes 9 and forced upwardly therein under the action of air-compression in the reservoir-tank above the water therein. The device provides for a constant supply of water on the upper floors of the building, to which the water would otherwise not flow owing to insufficient pressure in the water-supply.

The apparatus is of marked utility in connection with stills and water-filters where it is desirable to maintain a constant supply of water in order to permit a continuous operation of the still or filter.

I claim as my invention—

1. In a water-supply apparatus, the combination of a supply-pipe, a check-valve located at the lower end of said supply-pipe, one or more discharge-cocks having connection with said supply-pipe above said check-valve, a reservoir-tank surmounting and having connection with said supply-pipe above the location of said discharge cock or cocks, a check-valve located in the upper end of said supply-pipe in proximity to said reservoir-tank, and a discharge-cock having connection with the supply-pipe between the upper check-valve and the reservoir; substantially as described.

2. In a water-supply apparatus, the combination of a supply-pipe, one or more discharge-cocks connected to said supply-pipe, a check-valve arranged in said supply-pipe below said cock or cocks, a reservoir-tank having connection with said supply-pipe at its upper end, a check-valve in the upper end of said supply-pipe in proximity to said tank, a pressure-pipe having connection to and communicating with said tank, and a pressure-valve located in said pressure-pipe; substantially as described.

3. A water-supply apparatus comprising an elevated air-tight reservoir-tank, a supply-pipe connected directly with the base of the reservoir-tank, a check-valve located in the inlet end of the supply-pipe, a check-valve located in the outlet end of the supply-pipe, a branch pipe having a faucet and connected with the supply-pipe intermediate of the check-valves, and a branch pipe having a faucet and connected with the supply-pipe between the upper check-valve and the reservoir-tank; substantially as described.

THOMAS CANTWELL.

In presence of—
E. S. KNIGHT,
M. P. SMITH.